No. 847,878. PATENTED MAR. 19, 1907.
A. J. BALDWIN.
MACHINE FOR MAKING WIRE GLASS.
APPLICATION FILED DEC. 1, 1904.
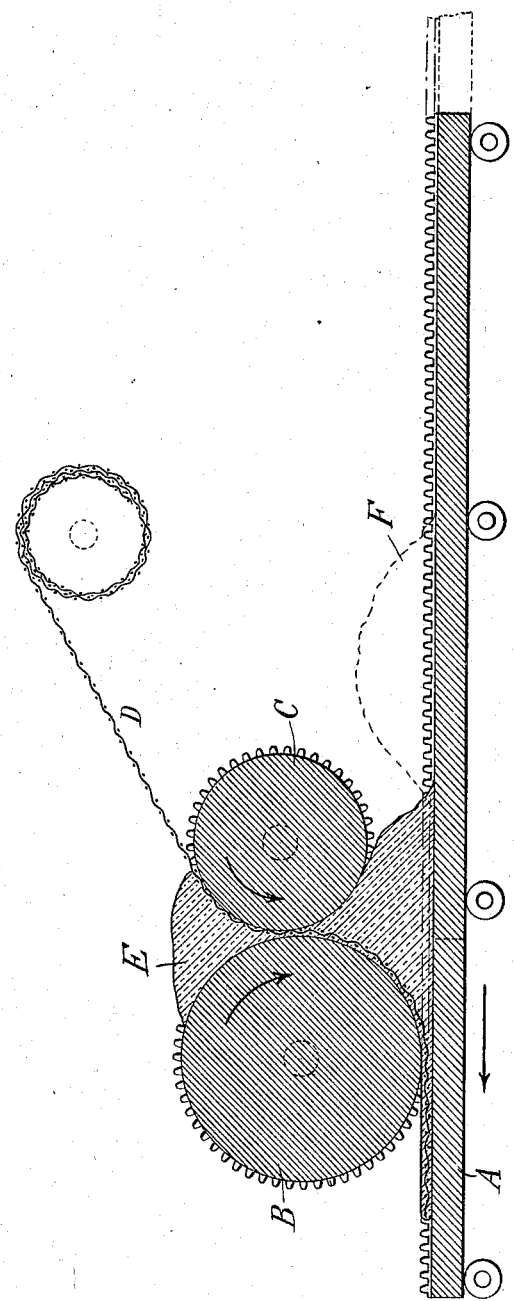
Witnesses
Raphaël Netter
S. L. Dunham
A. J. Baldwin Inventor
By his Attorneys
Kerr, Page & Cooper

UNITED STATES PATENT OFFICE.

ARTHUR J. BALDWIN, OF EAST ORANGE, NEW JERSEY.

MACHINE FOR MAKING WIRE-GLASS.

No. 847,878.   Specification of Letters Patent.   Patented March 19, 1907.

Application filed December 1, 1904. Serial No. 234,980.

*To all whom it may concern:*

Be it known that I, ARTHUR J. BALDWIN, a citizen of the United States, residing at East Orange, in the county of Essex and State of New Jersey, have invented certain new and useful Improvements in Machines for Making Wire-Glass, of which the following is a specification, reference being had to the drawings accompanying and forming part of the same.

In the manufacture of "wire-glass," or glass in the form of sheets with a wire netting or fabric embedded therein, it has been customary to roll a batch of molten glass into a sheet, apply to such sheet (usually upon the surface thereof) a wire fabric, and then spread a second layer of molten glass on the composite sheet so formed. These operations, it has been found, must be carried on progressively and substantially simultaneously in order to produce a commercial product; but difficulty has been encountered in devising machines for carrying out the process economically and easily. It has been usual to employ for the purpose a rolling bed or table and a series of rolls, generally two or three in number, to spread the batches of glass and to apply the wire fabric to the first layer or sheet and embed it in the surface of the same.

My present invention resides in a machine for accomplishing the same result, but in a novel way, at the same time embodying certain advantages over those heretofore employed, in case of operation.

In carrying out my invention I employ the usual table or bed, above which I arrange a system of rolls, generally two in number, one of the same coöperating with the table and the other coöperating with the first mentioned. Between the rolls I deposit a batch of molten glass, which is thereby formed into a sheet and delivered upon the table between the same and the roll which coöperates therewith. At the same time I pass over the other roller a sheet of wire fabric, which as the rolls revolve to form the glass sheet is embedded in the surface of the same—that is to say, in that surface of the sheet which is toward the rolling-table. The table itself moves longitudinally and has deposited on it a batch of molten glass, which is thereby carried against the composite sheet of glass and surface-embedded fabric as the same issues from the rolls. The table continuing to move in the same direction the batch of glass thereon is formed into a sheet by the second roller under the composite layer mentioned and in close contact with the wire fabric carried by the same. The pressure of the roll upon the two layers of glass welds them together with the wire fabric between, thus forming the desired finished product.

In the accompanying drawing I have illustrated the preferred embodiment of the invention broadly described above, in which is shown a side elevation of the same.

A designates a bed or table, generally similar to those now in use in the manufacture of wire-glass and capable of longitudinal movement, as in the direction of the arrow.

B and C are coacting rolls, the former being preferably the larger, mounted above the table and rotated in the directions shown by the arrows at the same peripheral speed as the lineal speed of the table. The former roll is separated from the table by a space equal to the desired thickness of the finished article, and the second is elevated a considerably greater distance therefrom.

In using the machine a strip of wire fabric D is introduced between the rolls B and C, in contact with the latter, and a batch of molten glass or "metal" E is deposited upon and between the rolls. The revolving rollers then roll the glass out into a sheet, with the wire-netting embedded in the surface of the same. At the proper place to meet the descending sheet as the table moves forward there is deposited on the latter a batch of molten metal, as shown in dotted lines at F. As the table advances the mass F becomes banked up against the rolls B and C. The continued movement of the table and the coöperating roll B forms the batch F into a sheet under the sheet produced from the batch E, which, it will be remembered, has the wire fabric embedded in its lower surface. The operation of forming the two layers thus goes on progressively, and the two are united under the roll B.

It will thus be seen that the machine consists, essentially, of only three moving parts, making an apparatus which is not only extremely simple in construction, but also very effective in operation. Another very important advantage flows from the banking-up of the batch F against the roll C and the descending composite layer. The wire-carrying surface of the latter is thoroughly heated by the batch of molten metal F, and the formation of a "skin" on the surface is thereby prevented, or if the roll C were unduly cool, resulting in the formation of such a skin on that surface of the composite sheet, the heat of the batch F will soften the skin and reduce it to the same consistency as the rest of the sheet. This elimination of any possible skin between the two layers of glass insures a positive and perfect uniting of the same, making a finished sheet of wire-glass which is practically homogeneous, and thus well able to withstand shocks or blows.

What I claim is—

In a machine for the manufacture of wire-glass, the combination with a moving table, of a roll spaced therefrom a distance equal to the thickness of the finished sheet of wire-glass, and a second roll, over which a sheet of wire fabric is passed in contact therewith, said roll being out of direct operative relation to the table and spaced from the first-mentioned roll a distance equal to substantially half the thickness of the finished sheet of wire-glass; both rolls being adapted to revolve at the same peripheral speed as the lineal speed of the table, as set forth.

ARTHUR J. BALDWIN.

Witnesses:
  HENRY SCHRENHERR,
  D. M. DEAN.